United States Patent [19]
Fushimi et al.

[11] 3,903,959
[45] Sept. 9, 1975

[54] GAS TURBINE ENGINE HEAT REGENERATOR

[75] Inventors: Shingi Fushimi, Yokosuka; Katsuhiro Kishida; Hiroyuki Aoki, both of Yokohama, all of Japan

[73] Assignee: Nissan Motor Co., Ltd., Yokohama, Japan

[22] Filed: Aug. 14, 1973

[21] Appl. No.: 388,173

[30] Foreign Application Priority Data
Aug. 15, 1972  Japan.............................. 47-81635

[52] U.S. Cl. .................. 165/9; 277/96; 277/227
[51] Int. Cl. ............................................ F28d 19/00
[58] Field of Search .................. 165/9; 277/96, 227

[56] References Cited
UNITED STATES PATENTS
| | | | |
|---|---|---|---|
| 3,576,208 | 4/1971 | Cassidy................................. | 165/9 |
| 3,646,993 | 3/1972 | Rice et al............................. | 165/9 |
| 3,659,861 | 5/1972 | Rao et al. ........................... | 165/9 X |
| 3,730,538 | 5/1973 | Silverstone et al. ................ | 165/9 X |

FOREIGN PATENTS OR APPLICATIONS
| | | | |
|---|---|---|---|
| 634,627 | 3/1950 | United Kingdom..................... | 165/9 |
| 679,169 | 9/1952 | United Kingdom..................... | 165/9 |

Primary Examiner—Albert W. Davis, Jr.

[57] ABSTRACT

A fixed seal member and a rotary matrix member whose contacting sliding surfaces have porous layers impregnated with a heat-resisting lubricant, and a method of forming the porous layers.

5 Claims, 7 Drawing Figures

SPRAYING MATERIAL: $NiO : CaF_2 = 80:20$
POROSITY: 24%
SPRAYING DISTANCE: 150 mm $NiO, CaF_2$ SPRAYED LAYER
NICKEL ALUMINITE UNDERCOATING
18-8 STAINLESS STEEL (×100)

CORRUGATED PLATE
FLAT PLATE
CORRUGATED PLATE (×100)

GAS TURBINE ENGINE HEAT REGENERATOR

This invention relates to an improved gas turbine engine heat regenerator and, more particularly, to a disc type rotary heat regenerator for a gas turbine engine having a seal member and a matrix member whose contacting sliding surfaces have porous layers impregnated with a heat-resisting lubricant, and a method of forming the porous layers.

As is well known, a disc type heat regenerator for a gas turbine engine commonly has a seal member fixed in the housing of the gas turbine engine and a matrix member made of a ceramic material rotatably mounted in the housing of the gas turbine. The matrix member is so disposed that it slidably contacts the seal member and rotates in close contact therewith under high pressure. A working medium such as air passes from a compressor to a combustor through the seal and matrix members, and is heated by hot engine exhaust gas also passing therethrough, as is well known by those skilled in the art. During this operation, the seal member prevents leakage of the working medium. As is apparent from the foregoing, the seal member and the matrix member are subjected to high temperature and friction which may cause extreme wear. Therefore, they must resist this friction and wear at high temperature and, in addition, must withstand considerably rapid temperature changes during normal operation as well as a rapid temperature rise when the engine starts.

Heretofore, for a seal member of this type, a sintered material made from, for example, a mixture of a metal oxide and a fluoride, phosphate, or borate of an alkaline-earth group IIa metal, or a refractory metal material sprayed with the aforementioned mixture has been used. However, this prior art has the disadvantages that the seal member itself wears greatly due to friction with the matrix member at high temperature (approx. 500°C to 700°C), and the ceramic matrix member also wears at a substantial rate with the consequent result that it becomes difficult to maintain sufficient sealing ability for a long duration.

It is, therefore, an object of the present invention to provide a heat regenerator which is highly stable in operation by eliminating the aforementioned disadvantages of the prior art.

It is another object of the present invention to provide a heat regenerator having a seal member and a matrix member which have superior lubricating properties and wear resisting characteristics at high temperature, and long operating lifetimes.

According to the present invention, there is provided a disc type rotary heat regenerator for a gas turbine engine having a housing, which comprises a seal member fixed in the housing and a matrix member rotatably mounted in sliding contact with the seal member, the contacting surfaces of the two members having layers of porous material. Of the two porous layers, at least the porous layer of the seal member is impregnated with a heat resisting lubricant.

According to the present invention, there is also provided a method of forming an impregnated porous layer on the surface of the seal member which comprises the step of applying an undercoating material onto the surface of the seal member, the step of spraying powder particles of a mixture comprising a first material selected from the group consisting of nickel oxide and cobalt oxide and a second material selected from the group consisting of alkaline-earth metal fluoride, phosphate and borate onto the surface of the seal member, and the step of impregnating the porous layer with a heat resisting lubricant selected from the group consisting of graphite, molybdenum disulphide, tungsten disulphide, boron nitride and sericite.

These and other objects, features and advantages of the present invention will become more fully apparent from the following description taken in conjunction with the accompanying drawings, in which.

Figure 1:
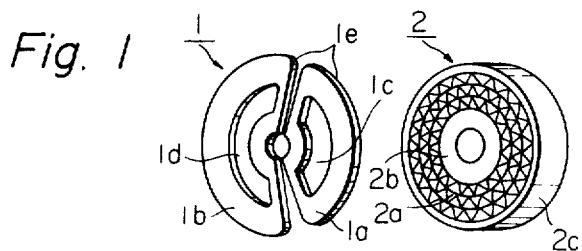
FIG. 1 is an exploded perspective view of one embodiment of a seal member and matrix member assembly of a conventional disc type rotary heat regenerator to an improvement of which the present invention is directed.

Referring to FIG. 1, a seal member generally indicated as 1 is fixed in a housing (not shown) of a gas turbine engine (not shown). It is preferably divided into two parts 1a and 1b. The parts 1a and 1b have openings 1c and 1d, respectively. In addition, an impregnated porous layer 1e is formed on the rear surfaces (as shown) of the parts 1a and 1b of the seal member 1. The surface of the impregnated porous layer acts as a sliding surface. A matrix member generally indicated as 2 is rotatably mounted in the housing of the gas turbine engine. The matrix member 2 has a honeycomb structure 2a consisting of flat plates and corrugated plates (no numerals), and a hub 2b situated in the center of the honeycomb structure 2a for receiving a driving shaft (not shown). A casing 2c surrounds the honeycomb structure 2a. End surfaces of the honeycomb structure 1a, hub 2b and casing 2c act as sliding surfaces which slidably engage with the surface of the porous layer 1e of the seal member 1.

In operation, the matrix member 2 is rotated relative to the seal member 1 with respective sliding surfaces in close contact with each other. As is well known, a working medium such as air flows from a compressor (not shown) to a combustor (not shown) through the opening 1c of the seal member 1 and the matrix member 2. While flowing through the matrix member 2, the working medium is preheated by hot turbine exhaust gas passing through the opening 1d of the seal member 1 and the matrix member 2. Consequently, the sliding surfaces of the seal member 1 and matrix member 2 are subjected to high friction and high temperature.

According to this invention, the porous layer of the seal member 1 is formed and impregnated as follows: An undercoating material such as powdered nickel aluminite is first sprayed onto the designated surface of the seal member. Then, a mixture of powders of nickel oxide and calcium fluoride is sprayed onto the undercoated surface of the seal member. The grain size of the powders is suitably selected. The content of nickel oxide is preferably 75 to 90% by weight and that of calcium fluoride is preferably 10 to 25% by weight. If the content of nickel oxide is higher than 90% and that of calcium fluoride is lower than 10%, the spraying efficiency will deteriorate at high temperature. If the content of nickel oxide is lower than 75% and that of calcium fluoride is higher than 25%, adhesion of the sprayed porous layer will deteriorate. The porosity of the sprayed porous layer is preferably 20 to 30% by volume, and can be adjusted by varying the spraying distance. If the porosity is higher than 30%, the sprayed porous layer will become brittle. A porosity of less than 20% is difficult to obtain. Nickel oxide may be replaced by cobalt oxide, and calcium fluoride may be replaced by, an alkaline-earth metal fluoride, phosphate or borate.

After a desired sprayed porous layer is formed on the seal member, the porous layer is impregnated with a heat resisting lubricant such as graphite, molybdenum disulphide, tungsten disulphide, boron nitride or sericite.

When an impregnated porous layer is to be formed on the surface of a matrix member, the same process as described above may be adopted. However, a matrix member is usually made of a ceramic and, therefore, is itself porous. Accordingly, in this case, it is not necessary to form a sprayed porous layer on the matrix member. It will suffice to impregnate the ceramic matrix member with a heat resisting lubricant.

The following Examples are given by way of illustration only, and should not be construed as limiting the scope of the invention.

EXAMPLE 1

Figure 2:
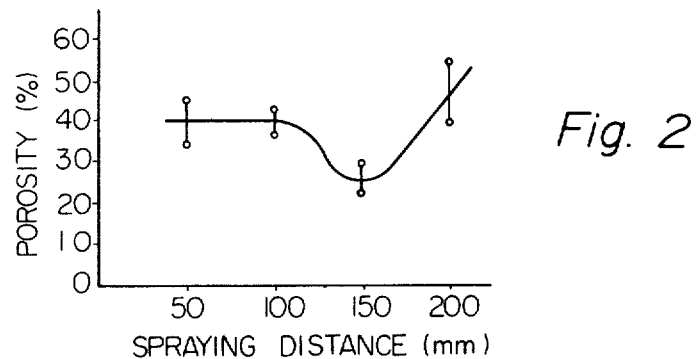
FIG. 2 is a diagram showing the relationship between the porosity of the porous layer of the seal member and the spraying distance.
Figure 3:
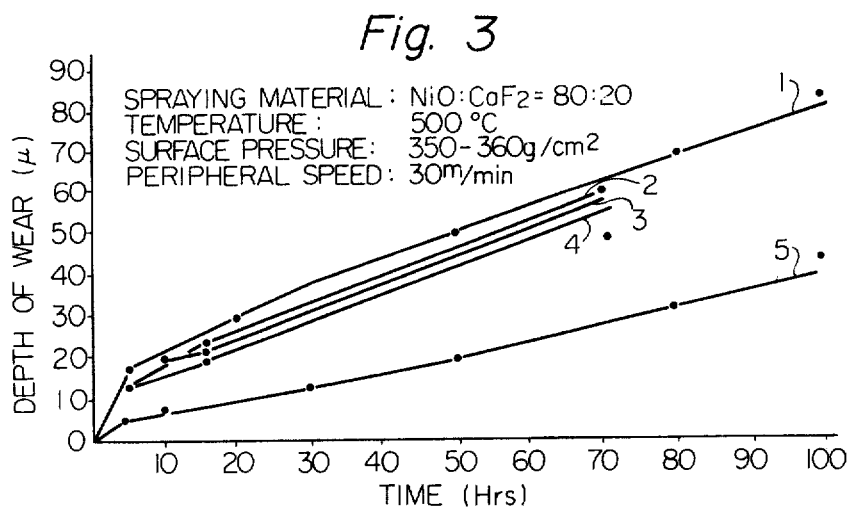
FIGS. 3 to 5 are diagrams showing the relationship between the depth of wear of porous layers of seal members according to this invention as a function of elapsed time under various conditions.
Figure 6:
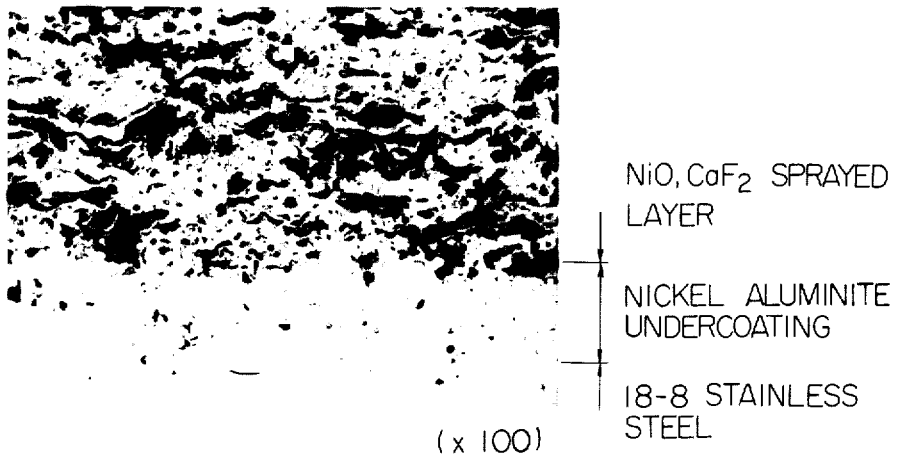
FIG. 6 is an optical microstructure (X100) view of a section of a sprayed porous layer on an undercoated seal member according to the present invention.

After powdered nickel aluminite was sprayed onto the surface of an 18-8 stainless steel seal member to form an undercoating layer, powder particles of a mixture of 80% by weight nickel oxide and 20% by weight calcium fluoride, the particle sizes of which had been suitably selected, were sprayed thereon. The spraying process was conducted at an electric current of 400 amperes, voltage of 75 volts, hydrogen flow rate of 15 cc/sec and nitrogen flow rate of 75 cc/sec. In addition, the spraying distance of the powder particles was varied to obtain various porous layers with different porosities. FIG. 2 is a diagram showing the relationship between the spraying distance and the porosity of a sprayed porous layer. As shown, the porosity could be varied from 20 to 60% by varying the spraying distance of the particles. FIG. 6 shows the optical microstructure of a section of a sprayed porous layer which was formed by spraying the particles from a distance of 150 mm. The obtained porosity was 25%. In the photograph, porous regions appear as black. The seal member with a sprayed porous layer thus formed was immersed in a solution of boron nitride in alcohol under vacuum thereby impregnating the porous layer with boron nitride. The seal member thus impregnated was fully dried, and was then rotated relative to and in abutting sliding contact with a ceramic matrix member at a temperature of 500°C, surface pressure of 350 to 360g/cm$^2$ and a peripheral speed of 30m/m for a predetermined time. Then the amount of wear of the seal member was measured. The results are shown in FIG. 3, which shows the relationship between the depth of wear ($\mu$) and elapsed time. In FIG. 3, a curve 1 represents the wear of a seal member having a non-impregnated porous layer with a porosity of 25%, a curve 2 shows the wear of a seal member having a porous layer with a porosity of 53% impregnated with boronnitride, a curve 3 shows the wear of a seal member having a porous layer with a porosity of 35% impregnated with boron-nitride, a curve 4 shows the wear of a seal member having a porous layer with a porosity of 42% impregnated with boron-nitride, and a curve 5 shows the wear of a seal member having a porous layer with a porosity of 25% impregnated with boron-nitride. The porosities 25%, 53%, 35%, and 42% mentioned above correspond to spraying distances of 150 mm, 200 mm, 100 mm and 50mm, respectively.

As seen from these curves, the amount of wear of a seal member having a porous layer with a porosity of 35% or higher impregnated with boron-nitride (curves 2 to 4) was not much different from that of a seal member having a porous layer non-impregnated (curve 1). However, the amount of wear of a seal member having a porous layer with a porosity of 25% impregnated with boron-nitride (curve 5) was nearly half that of a seal member having a non-impregnated porous layer with a porosity of 25% (curve 1). In this case, the ceramic matrix member was not worn at all.

EXAMPLE 2

Figure 4:
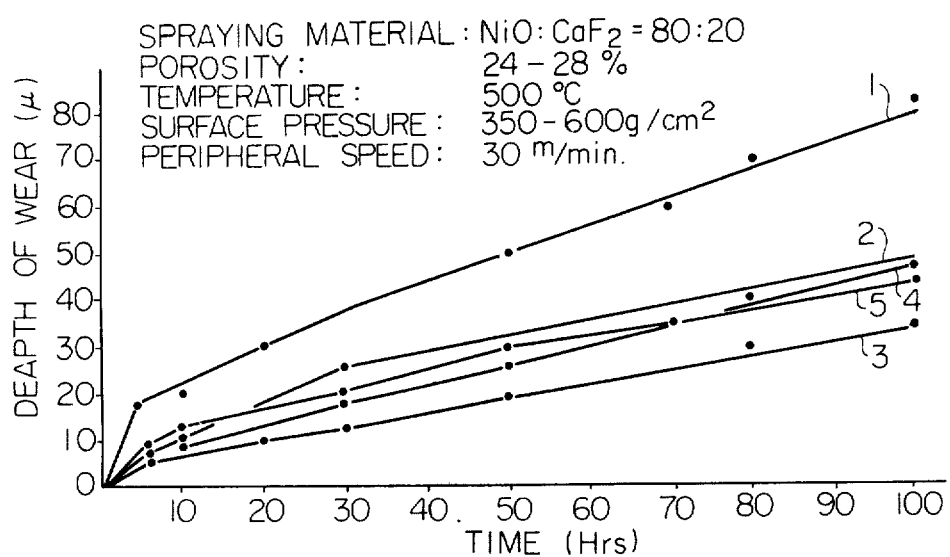

After a powdered mixture of nickel oxide and calcium fluoride was sprayed onto a seal member using the same method as that of Example 1, to form a porous layer having a porosity of about 25%, the porous layer was impregnated with molybdenum disulphide, tungsten disulphide, sericite or graphite. The seal member thus impregnated was rotated in sliding abutting contact with the ceramic matrix member under the same conditions as in Example 1. FIG. 4 shows the relationship between the wear depth and elapsed time of the seal member. The sprayed porous layer had a porosity of 24 to 28%. In the diagram of FIG. 4, a curve 1 illustrates the wear of a seal member having a porous layer not impregnated, a curve 2 shows the wear of a seal member having a porous layer impregnated with sericite, a curve 3 shows the wear of a seal member having a porous layer impregnated with tungsten disulphide, a curve 4 shows the wear of a seal member having a porous layer impregnated with molybdenum disulphide, and a curve 5 shows the wear of a seal member having a porous layer impregnated with graphite.

As is also seen from these curves in FIG. 4, the wear of a seal member having its porous layer impregnated was nearly half that of a seal member having a porous layer not impregnated.

It is generally maintained that the lubricating ability of molybdenum disulphide and tungsten disulphide is maintained up to 400°C. Therefore, if these lubricants are used at a temperature of 500°C, they will partly decompose. However, since sulphur produced by the decomposition also has a lubricating capacity, the wear of the seal member having a porous layer impregnated with molybdenum disulphide or tungsten disulphide (curves 3 and 4) was one-half to one-third that of a seal member having a porous layer not impregnated (curve 1).

EXAMPLE 3

Figure 5:
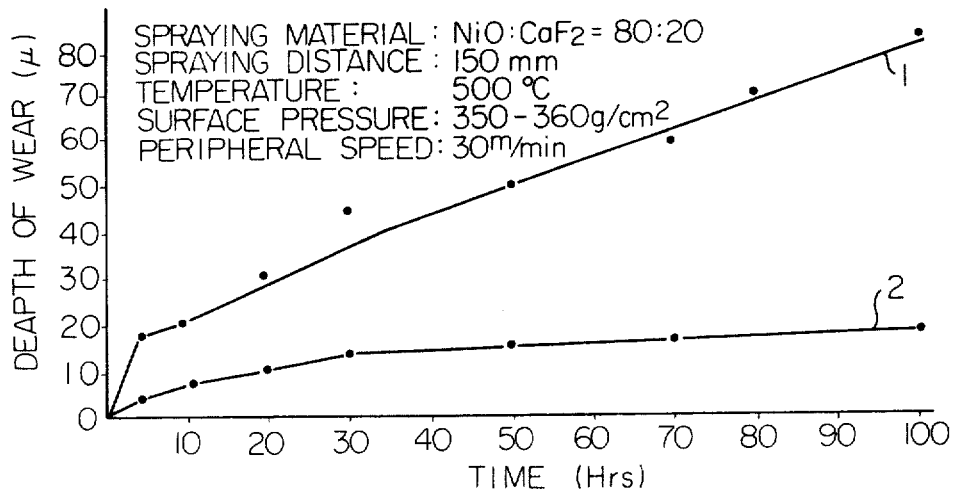
Figure 7:
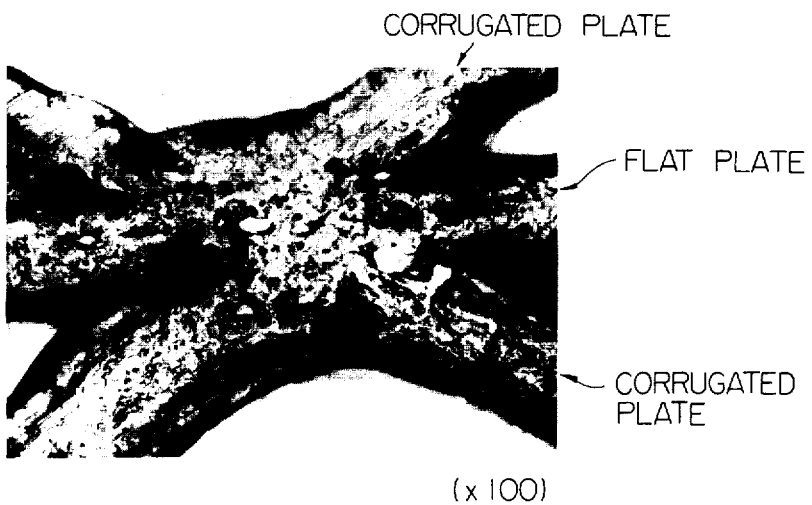
FIG. 7 is an optical microstructure (X100) view of the sliding surface of a matrix member according to the present invention.

FIG. 7 shows the optical microstructure of a section of a ceramic matrix member. As seen from this photograph, there exist a number of pores in the flat and corrugated plates which form the matrix member. Therefore, in this example, the matrix member was impregnated with boron nitride by the same method as that of Example 1. A seal member with a porous layer was rotated in abutting sliding contact with the impregnated ceramic matrix member for a predetermined time. Then the amount of wear of the seal member was measured. FIG. 5 shows the relationship between the wear and elapsed time of the seal member. In the case of seal members of this example, the spraying material was a mixture of 80% by weight nickel oxide and 20% by weight calcium fluoride, the spraying distance was 150 mm, and the test conditions were 500°C, 350 to 360g/cm$^2$ surface pressure and peripheral speed 30 m/m, which were the same as those in Example 1. The results are shown in FIG. 5 in the same way as in FIG. 3. In FIG. 5, a curve 1 shows the wear of a seal member having a non-impregnated sprayed porous layer, and a curve 2 the wear of a seal member having a porous layer impregnated with boron nitride.

As is seen from these curves in FIG. 5, the wear of a seal member having its sprayed porous layer impregnated is almost one-fifth that of a seal member having a sprayed porous layer not impregnated. The ceramic matrix member in this example has not worn at all and can maintain sufficient sealing capacity for a long time. Since only the porous portion of the sliding surface of the matrix member is impregnated with boron nitride, the area of the flow passageways of the matrix member is not reduced, nor are the heat exchanging capacity and durability thereof decreased.

It should be understood from the foregoing description that since a matrix member and seal member for a gas turbine engine of the present invention have the advantage that the amount of wear of the seal member can be reduced to about one-half to one-fifth that of a conventional design at high temperature, and in addition the matrix member is not worn at all thereby providing extremely stable sealing performance and superior lubricating ability for a long time.

What is claimed is:

1. A disc type rotary heat regenerator for a gas turbine engine having a housing and comprising a seal member fixed in said housing, a first porous layer formed on a surface of said member and having a porosity of 20% to 30% by volume, said first porous layer being formed of a mixture of powders, comprising a first material selected from the group consisting of nickel oxide and cobalt oxide, and a second material selected from the group consisting of alkaline-earth metal fluoride, phosphate and borate, a matrix member rotatably mounted in said housing, a second porous layer formed on a surface of said matrix member, said matrix member being rotatable relative to said seal member with said first and second porous layers in abutting contact with each other, and a heat resisting lubricant, at least said first porous layer being impregnated with said heat resisting lubricant, said heat resisting lubricant being selected from the group consisting of graphite, molybdenum disulphide, tungsten disulphide, boron nitride and sericite.

2. A disc type rotary heat regenerator for a gas turbine engine as claimed in claim 1, wherein the content of said first material in said mixture is 75 to 90% by weight and that of said second material is 10 to 25% by weight.

3. A disc type rotary heat regenerator for a gas turbine engine as claimed in claim 1, wherein said porous layer of said matrix member is impregnated with said heat resisting lubricant.

4. A disc type rotary heat regenerator for a gas turbine engine as claimed in claim 1, said matrix member being made of a ceramic.

5. A disc type rotary heat regenerator for a gas turbine engine as claimed in claim 4, said ceramic matrix member being impregnated with said heat resisting lubricant consisting of graphite, molybdenum disulphide, tungsten disulphide, boron nitride, and sericite.

* * * * *